United States Patent
Huang et al.

(10) Patent No.: US 10,146,337 B2
(45) Date of Patent: Dec. 4, 2018

(54) DIGITAL HANDWRITING DEVICE AND METHOD OF USING THE SAME

(71) Applicant: Samsung Electronics Co., Ltd, Suwon-si (KR)

(72) Inventors: Pei Huang, Bellvue, WA (US); Yu Wang, Seattle, WA (US); Pei Zheng, Seattle, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/267,126

(22) Filed: Sep. 15, 2016

(65) Prior Publication Data

US 2018/0074606 A1      Mar. 15, 2018

(51) Int. Cl.
*G06F 3/0354*  (2013.01)
*G06F 3/03*    (2006.01)

(52) U.S. Cl.
CPC ........ *G06F 3/03545* (2013.01); *G06F 3/0304* (2013.01)

(58) Field of Classification Search
CPC ............................. G06F 3/03545; G06F 3/0304
See application file for complete search history.

(56) References Cited

U.S. PATENT DOCUMENTS

| | | | |
|---|---|---|---|
| 6,188,392 B1 | 2/2001 | O'Connor et al. | |
| 6,614,422 B1* | 9/2003 | Rafii | G06F 1/1626 345/156 |
| 8,487,915 B1* | 7/2013 | Birger | H04N 9/3173 178/18.01 |
| 9,128,537 B2* | 9/2015 | Song | G06F 3/033 |
| 9,354,725 B2* | 5/2016 | Al-Sharif | G06F 3/03545 |
| 9,619,052 B2* | 4/2017 | Bernstein | G06F 3/03545 |
| 9,658,704 B2* | 5/2017 | Bernstein | G06F 3/03545 |
| 9,720,550 B2* | 8/2017 | Ancona | G06F 3/044 |
| 9,753,556 B2* | 9/2017 | Bernstein | G06F 3/03545 |
| 2010/0001962 A1 | 1/2010 | Doray et al. | |
| 2010/0001998 A1* | 1/2010 | Mandella | G01B 11/002 345/419 |
| 2010/0013860 A1* | 1/2010 | Mandella | G01B 21/04 345/650 |
| 2010/0045785 A1 | 2/2010 | Carl | |
| 2010/0181121 A1* | 7/2010 | Tremblay | G06F 3/03545 178/19.01 |
| 2011/0298760 A1 | 12/2011 | Gila | |
| 2013/0257777 A1* | 10/2013 | Benko | G06F 3/03545 345/173 |

(Continued)

*Primary Examiner* — Afroza Chowdhury

(57) ABSTRACT

A digital handwriting system that includes an electronic device and a method of using the same. The present disclosure teaches a method that includes identifying content stored on the electronic device to be projected onto a surface; identifying occurrence of a touch event of an accessory; capturing an image of the touch event to determine initial position data indicating an initial position of the accessory relative to the projected content; receiving movement tracking data indicating movement of the accessory; and updating the content using the initial position data and the movement tracking data. Various embodiments may further include using an inertial movement unit (IMU) disposed in an electronic accessory for determining movement tracking data of the accessory. Moreover, updating the content may include updating the projected content in real-time.

17 Claims, 7 Drawing Sheets

(56) References Cited

U.S. PATENT DOCUMENTS

| | | |
|---|---|---|
| 2014/0104187 A1 | 4/2014 | Bakken et al. |
| 2014/0118310 A1 | 5/2014 | Black et al. |
| 2014/0160080 A1 | 6/2014 | Craft |
| 2014/0160090 A1 | 6/2014 | Xu et al. |
| 2014/0160092 A1 | 6/2014 | Tseng |
| 2014/0176735 A1 | 6/2014 | Short et al. |
| 2014/0210799 A1 | 7/2014 | Kalaldeh et al. |
| 2015/0009155 A1* | 1/2015 | Tsao .................. G06F 3/03545 345/173 |
| 2015/0244911 A1* | 8/2015 | Xie ..................... H04N 5/2258 348/207.11 |
| 2016/0313820 A1* | 10/2016 | Ancona ................ G06F 3/044 |
| 2016/0364026 A1* | 12/2016 | Bernstein ............ G06F 3/03545 |

\* cited by examiner

DIGITAL HANDWRITING DEVICE AND METHOD OF USING THE SAME

TECHNICAL FIELD

This disclosure generally relates to electronic devices and input systems designed for sensing surfaces of electronic devices. More specifically, this disclosure relates to digital handwriting on surfaces using an electronic device with a projector and a method of using the same.

BACKGROUND

The touch-sensitive screen has motivated many input systems designed on sensing a surface of mobile electronic devices. For example, touch sensor systems have been used to determine the positioning of a user's fingers using touch sensors or proximity sensors. Additionally, transducer input systems utilize digitizers to detect a transducer (e.g. a stylus or an electronic pen) through the electromagnetic signal emitted by the transducer. Some systems have introduced a combination of touch and transducer input systems.

However, while the note-taking abilities offered by electronic input devices provide various advantages over the traditional handwriting methods using a pen and a paper, people still seem to prefer the conventional handwriting method in many instances. For example, user inconveniences associated with using an electronic device, such as screen size limitations and similar restrictions may lead to a user experience that is inconvenient, inefficient, or undesirable for extended use.

SUMMARY

The present disclosure provides a digital handwriting system using an electronic device and a method of using the same.

The present disclosure further provides an improved handwriting experience that allows users to accomplish handwriting tasks using traditional handwriting incorporated with a digital system. The disclosure aims to provide a more comfortable and efficient note-taking experience and drawing experience by providing both the convenience of operating in the paper domain and the functionality and flexibility associated with digital environments.

In accordance with an aspect of the present disclosure, an electronic device includes a memory, a transceiver, and at least one processor configured to identify content stored on the electronic device to be projected onto a surface, identify occurrence of a touch event of an accessory, capture an image of the touch event to determine initial position data indicating an initial position of the accessory relative to the projected content, receive movement tracking data indicating movement of the accessory, and update the content using the initial position data and the movement tracking data.

In accordance with another aspect of the present disclosure, a method of operating an electronic device includes identifying content stored on the electronic device to be projected onto a surface, identifying occurrence of a touch event of an accessory, capturing an image of the touch event to determine initial position data indicating an initial position of the accessory relative to the projected content, receiving movement tracking data indicating movement of the accessory, and updating the content using the initial position data and the movement tracking data.

In accordance with yet another aspect of the present disclosure, a non-transitory computer readable medium embodying a computer program, the computer program comprising computer readable program code that when executed, by at least one processor of an electronic device, causes the electronic device to identify content stored on the electronic device to be projected onto a surface, identify occurrence of a touch event of an accessory, capture an image of the touch event to determine initial position data indicating an initial position of the accessory relative to the projected content, receive movement tracking data indicating movement of the accessory, and update the content using the initial position data and the movement tracking data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

Throughout the drawings, like reference numerals will be understood to refer to like parts, components and structures.

DETAILED DESCRIPTION

Figure 1:
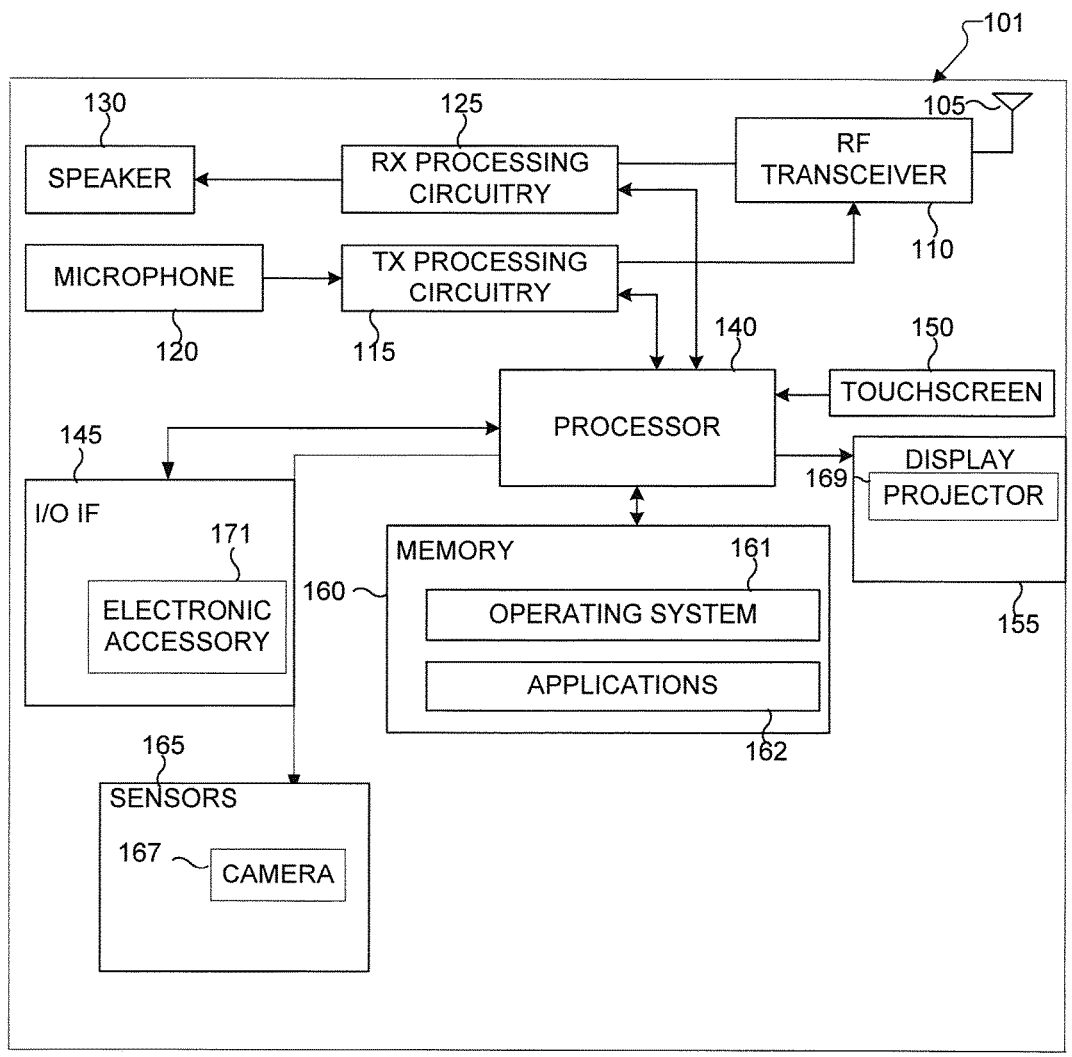
FIG. 1 illustrates an example electronic device according to this disclosure.

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

Embodiments of the present disclosure provide a method and apparatus for a digital handwriting system using an electronic device.

FIG. 1 illustrates an example electronic device according to embodiments of the present disclosure and in which embodiments of the present disclosure may be implemented. In various embodiments, electronic device 101 may take different forms, and the present disclosure is not limited to any particular form. For example, the electronic device 101 may be a mobile communication device, such as, for example, a user equipment (UE), a mobile station, a subscriber station, a wireless terminal, a smart phone, a tablet, etc.

As shown in FIG. 1, the electronic device 101 includes an antenna 105, at least one RF transceiver 110, transmit (TX) processing circuitry 115, and receive (RX) processing circuitry 125. The electronic device 101 also includes a processor 140, a memory 160, sensors 165, a display 155, a touchscreen 150, and an input/output interface 145.

The RF transceiver 110 receives from the antenna 105, incoming RF signals, such as signals transmitted by UEs in a same network. The RF transceiver 110 down-converts the incoming RF signals to generate IF or baseband signals. The IF or baseband signals are sent to the RX processing circuitry 125, which generates processed baseband signals by filtering, decoding, and/or digitizing the baseband or IF signals. The RX processing circuitry 125 transmits the processed baseband signals to the processor 140 for further processing.

The TX processing circuitry 115 receives analog or digital data (such as voice data, web data, e-mail, or interactive video game data) from the processor 140. The TX processing circuitry 115 encodes, multiplexes, and/or digitizes the outgoing baseband data to generate processed baseband or IF signals. The RF transceiver, for example RF transceiver 110, receives the outgoing processed baseband or IF signals from the TX processing circuitry 115 and up-converts the baseband or IF signals to RF signals that are transmitted via the antenna 105.

The processor 140 can include one or more processors or other processing devices that control the overall operation of the electronic device 101. For example, the processor 140 could control the reception of forward channel signals and the transmission of reverse channel signals by the RF transceiver 110, the RX processing circuitry 125, and the TX processing circuitry 115 in accordance with well-known principles. The processor 140 could support additional functions as well, such as more advanced wireless communication functions. For instance, the processor 140 could support beam forming or directional routing operations in which outgoing signals from multiple antennas are weighted differently to effectively steer the outgoing signals in a desired direction. Any of a wide variety of other functions could be supported in the electronic device 101 by the processor 140. In some embodiments, the processor 140 includes at least one microprocessor or microcontroller.

The processor 140 is also capable of executing programs and other processes resident in the memory 160, such as a basic operating system (OS), for example operating system 161. The processor 140 can move data into or out of the memory 160 as required by an executing process.

The processor 140 is also coupled to the backhaul or network interface 145. The backhaul or network interface 145 allows the electronic device 101 to communicate with other devices or systems over a backhaul connection or over a network. The interface 145 could support communications over any suitable wired or wireless connection(s). For example, when the electronic device 101 is implemented as part of a cellular communication system (such as one supporting 5G, LTE, or LTE-A), the interface 145 could allow the electronic device 101 to communicate with other eNBs over a wired or wireless backhaul connection. When the electronic device 101 is implemented as an access point, the interface 145 could allow the electronic device 101 to communicate over a wired or wireless local area network or over a wired or wireless connection to a larger network (such as the Internet). The interface 145 includes any suitable structure supporting communications over a wired or wireless connection, such as an Ethernet or RF transceiver.

The input/output interface 145 could allow an accessory 171 to provide input to the processor 140. The accessory 171 can be an electronic pen or stylus, for example. The accessory 171 could include multiple sensors therein, including pressure sensors or inertial movement sensors not depicted in FIG. 1. The accessory 171 provides input via interface 145 to the processor 140, and the processor uses the input for calculating values or performing other processing operations per the applications 162 saved in a memory 160 of the electronic device 101.

The memory 160 is coupled to the controller/processor 140. Part of the memory 160 could include a RAM, and another part of the memory 160 could include a Flash memory or other ROM. The memory 160 including the OS 161 could additionally include applications 162.

The sensors 165 are coupled to the processor 140. Sensors 165 could include one or more cameras, for example camera 167, and could additionally include various other sensors, for example, pressure sensors, illumination or light sensors, motion sensors, (not shown) etc.

The camera 167 could be controlled by the processor 140 to capture images, which could be saved into memory 160 for later use or viewing. To save power in an electronic device 101, the camera 167 could be turned on only for taking a single shot of an image; or the camera 167 could remain on for capturing multiple pictures. The camera 167 provides an image inputted via a camera sensor to the processor 140 in real-time.

Referring to FIG. 1, an electronic device 101 includes camera 167 for capturing an image of a touch event of an accessory 171, according to an embodiment of the disclosure. The image taken by the camera 167 is used by the processor 140 for calculating an initial position of the accessory 171 and determining the relative position of the accessory.

The display 155 is coupled to the processor 140. The display 155 could display various state information, numbers, characters, and images during operation of the electronic device 101 under control of the processor 140. That is, the display 155 displays broadcast images received by the electronic device 101 and provided to the processor 140.

The display 155 could include a projector, for example projector 169. Projector 169 could be used to project an image onto a surface. The processor 140 could control projector 169 for projecting of an image, for example a picture or document, onto a surface. Moreover, the projector 169 could be used to project an image captured by camera 167. Additionally or alternatively, the projector 169 could project mages or files saved in memory 160.

The projector 169 could be part of display 155 or could alternatively be included in sensors 165. More specifically, projector 169 could be a multiband camera that captures and projects hybrid near-infrared and visible light.

Figure 3A:
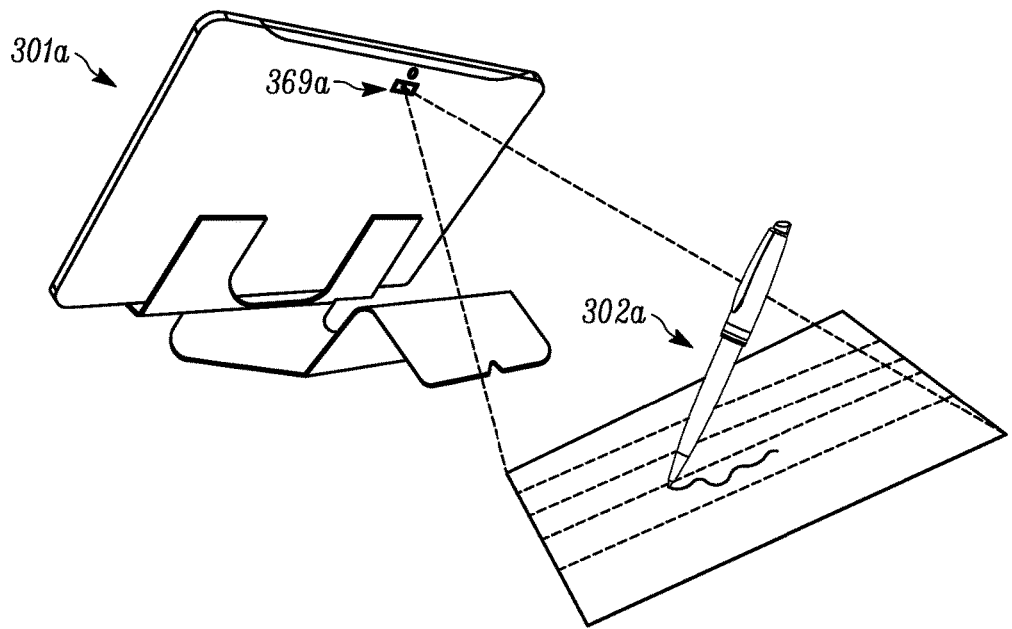
FIG. 3A illustrates an example electronic device according to this disclosure.
Figure 3B:
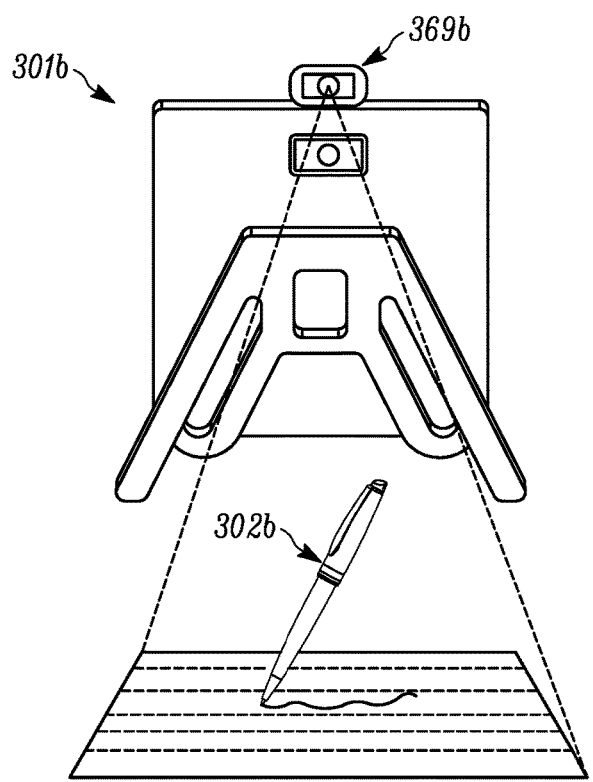
FIG. 3B illustrates another example electronic device according to this disclosure.

The projector 169 can be embedded in a host device as shown in FIG. 3A, the projector 369a being embedded in electronic device 301a. Alternatively or additionally, the projector could be a plug-in component or detachable unit as shown in FIG. 3B. The projector 369b in FIG. 3B could be a plug-in component of electronic device 301b.

Referring back to FIG. 1, the display 155 could provide an image of content that is identical to an image projected by projector 169. In an embodiment of the disclosure, the display 155 can be updated to include movement tracking data of the accessory 171, such that the updated image displayed on the display device 155 is updated in real-time according to changes to a content being displayed on a surface via the projector 169.

Processor 140 is additionally coupled to touchscreen 150. The touchscreen 150 could be a user interface for receiving input information, for example part of I/O IF 145. Touchscreen 150 could also be a display device, for example part of display 155; or can be an individual component of the electronic device 101.

FIG. 1 further illustrates a speaker 130 connected to the RX processing circuitry 125 of electronic device 101. Additionally, a microphone 120 sends input, for example voice input to the TX processing circuitry 115 as controlled by the processor 140.

Although FIG. 1 illustrates an example embodiment of an electronic device including an accessory of the present disclosure, various changes may be made to FIG. 1. Those of ordinary skill in the art should understand that the present disclosure includes various changes to the specific embodiments disclosed in the figures. For example, the electronic device could include multiple transceivers and/or sensors. Another example is that the electronic device does not include a microphone.

Figure 2:
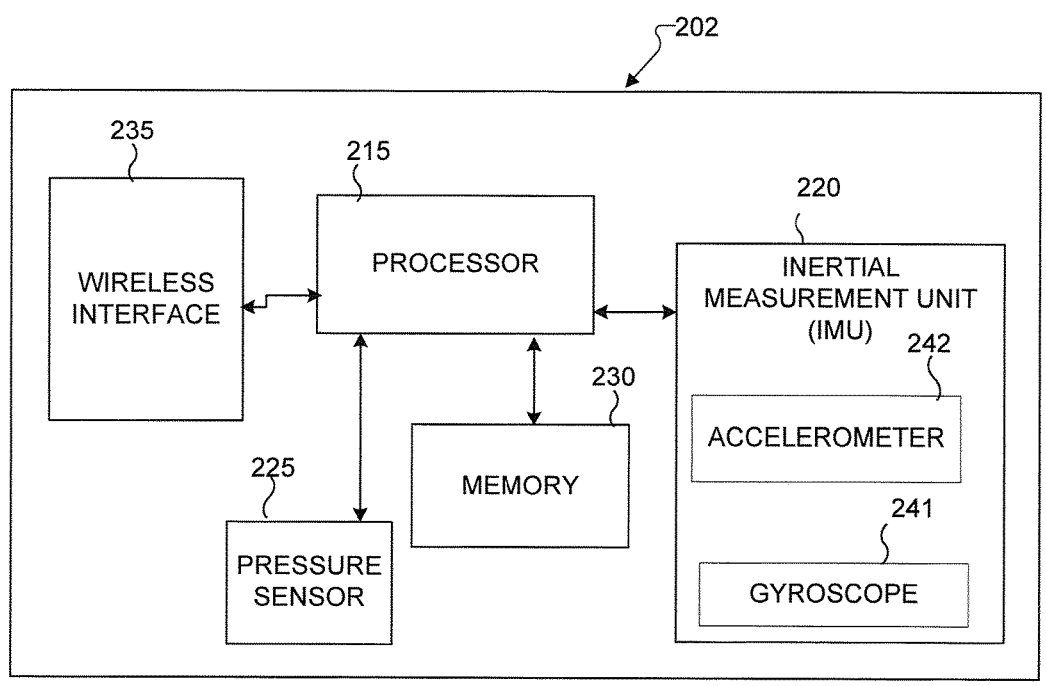
FIG. 2 illustrates an example electronic accessory according to this disclosure.

FIG. 2 illustrates an example electronic accessory according to this disclosure. FIG. 2 illustrates an example electronic device according to embodiments of the present disclosure and in which embodiments of the present disclosure may be implemented. In various embodiments, electronic accessory 202 may take different forms, and the present disclosure is not limited to any particular form. For example, the electronic accessory 202 may be an electronic pen, a stylus, etc. More specifically, the electronic accessory 202 could be, for example, the accessory 171 as shown in FIG. 1.

As shown in FIG. 2, the electronic accessory 202 includes a processor 215, memory 230, and wireless interface 235. The accessory 202 also includes a pressure sensor 225 and an inertial measurement unit (IMU) 220. The IMU includes at least one accelerometer, for example accelerometer 242, and a gyroscope 241.

The accessory 202 could additionally include at least one RF transceiver for receiving incoming RF signals, RX processing circuitry, and TX processing circuitry, none of which is shown in FIG. 2 for simplicity purposes. These components would function and perform as described above in relation to similar features in the electronic device of FIG. 1.

The processor 215 can include one or more processors or other processing devices that control the overall operation of the electronic accessory 202. Any of a wide variety of functions could be supported in the electronic accessory 202 by the processor 215. In some embodiments, the processor 215 includes at least one microprocessor or microcontroller.

The processor 215 is also capable of executing programs and other processes resident in the memory 230, such as a basic operating system (OS). The processor 215 can move data into or out of the memory 230 as required by an executing process.

The processor 215 is also coupled to the wireless interface 235. The wireless interface 235 allows the electronic accessory 202 to communicate with other devices or systems over a backhaul connection or over a network. The interface 235 could support communications over any suitable wireless connection(s). For example, when the electronic accessory 202 is implemented as part of a cellular communication system (such as one supporting 5G, LTE, or LTE-A), the interface 235 could allow the accessory 202 to communicate with other eNBs over a wireless backhaul connection, such a Bluetooth® (BT) connection, or over a wireless connection to a larger network (such as the Internet). The interface 235 includes any suitable structure supporting communications over a wired or wireless connection, such as an Ethernet or RF transceiver.

The wireless interface 235 could allow the accessory 202 to provide input to the processor 140 of the electronic device 101. The accessory 202 can be accessory 171, and the processor 215 can use the input for calculating values or performing other processing operations.

The pressure sensor 225 is coupled to the processor 215. The pressure sensor 225 can be disposed at an end of the accessory 202 and be used to measure a pressure exerted at the tip of the accessory 202. The processor 215 could determine if the pressure sensor 225 detects a pressure that is above a predefined threshold to mark a touch event of the accessory 202 and trigger a camera, for example camera 167, to capture an image. The image can be used to infer an absolute or initial position of the accessory 202. As long as the accessory 202 measures a pressure above the predefined threshold, the accessory 202 keeps taking measurements and sending them via wireless interface 235 to another electronic device, for example electronic device 101.

The inertial measurement unit (IMU) 220 of the accessory 202 includes at least one accelerometer, for example accelerometer 242, and a gyroscope 241. The accelerometer 242 can be used to calculate a moving distance of the accessory 202 and the gyroscope 241 can be used to determine a moving orientation. In combination with the information regarding the initial position, these measurements can be used to determine a relative position of the accessory.

The processor 215 can use the measurements obtained from the IMU 220 sensors and the pressure sensor 225 to reproduce the stroke of the handwriting of a person using the accessory 202. The handwriting can be shown on a display device, for example display at the correct corresponding location on a display device, such as display 155 of electronic device 101. The reproduced handwriting may also be projected onto a surface by projector 169.

In various embodiments of the disclosure, the pressure sensor 225 could also be used to obtain pressure measurements for determining a thickness of the handwriting and an amount of digital ink to use for reproducing the handwriting.

Although FIG. 2 illustrates one example of an electronic accessory, various changes may be made to FIG. 2. For example, the electronic accessory 202 may further include touch sensors for gathering information that could be used for security purposes or to determine an identity of a person before allowing a touch event to be recorded.

FIGS. 3A and 3B illustrate various embodiments of an electronic device and an electronic accessory corresponding thereto. For example, in FIG. 3A electronic device 301a includes a projector 369a embedded into the device 301a, and an accessory 302a that uses various sensors for indicating a touch event to the electronic device 301a. FIG. 3B shows an embodiment including electronic device 301b, a projector 369b that is a plug-in component, and electronic accessory 302b.

Figure 4:
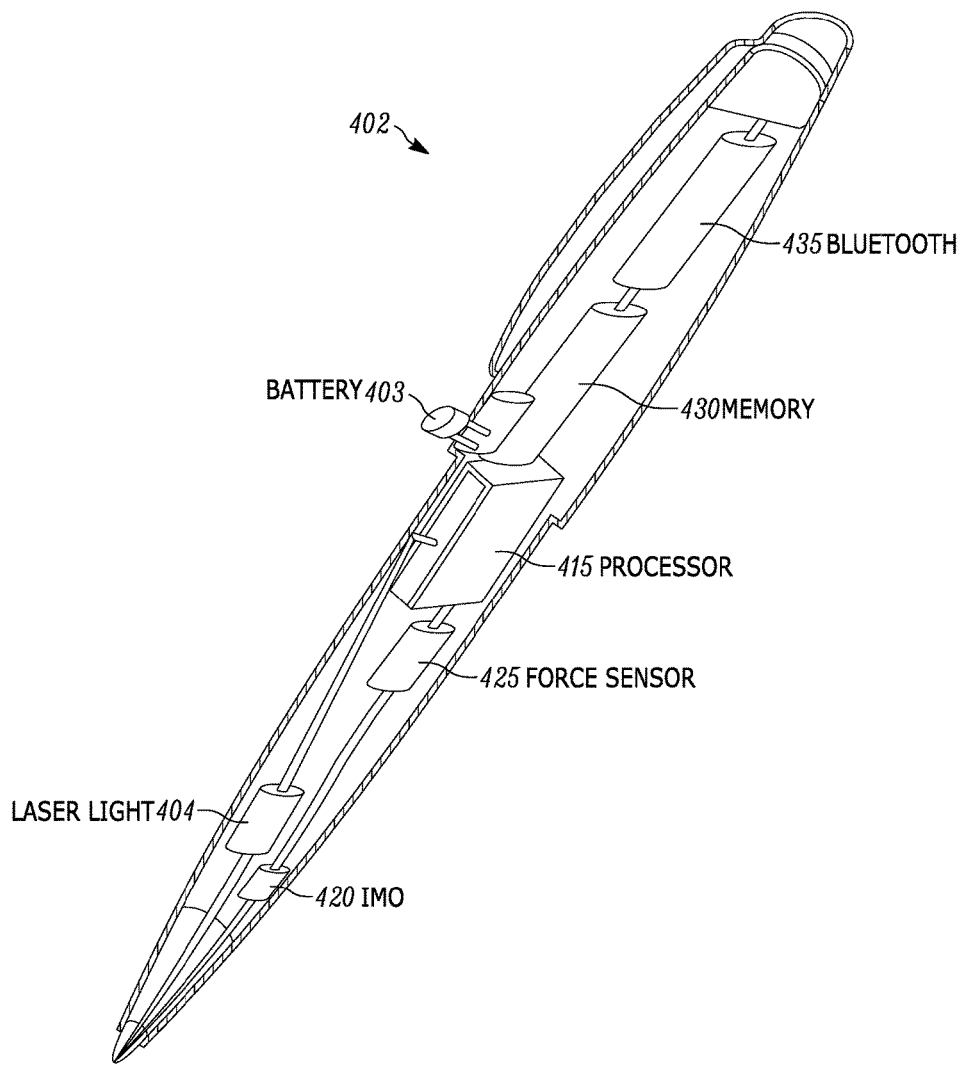
FIG. 4 illustrates an example electronic accessory according to this disclosure.

FIG. 4 illustrates an example configuration of an electronic accessory 402. The accessory 402 may be shaped like a pen and include a battery 403, a light sensor 404, a Bluetooth® or wireless interface 435, a memory 430, a processor 415, a pressure sensor 425, and an IMU 420.

In various embodiments of the disclosure, the electronic accessory 402 may be the same as electronic accessory 202 in FIG. 2. Although FIG. 4 illustrates one example of an electronic accessory, various changes may be made to FIG. 4 without deviating from the scope of the disclosure. For example, the electronic accessory 402 may further include a charging station (not shown) for inductive charging or wireless charging of the electronic accessory 402. Additionally, the wireless interface 435 may be a wireless local area network (WLAN) other than Bluetooth®, for example, a mobile hotspot or a wireless access point.

Figure 5:
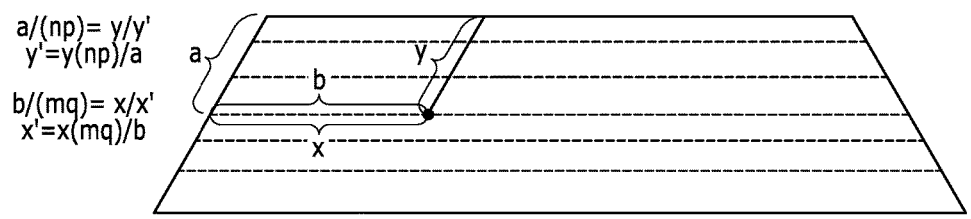
FIG. 5 illustrates an example of a projected image according to an embodiment of this disclosure.

FIG. 5 illustrates an example of a captured image of a projected content, according to various embodiments of this disclosure. A processor, for example processor 140, can use various measurements corresponding to the projected image in order to determine a handwriting stroke of a user of an accessory. Stated different, the processor 140 can include an algorithm to infer the absolute position of the accessory with respect to a projected interactive image.

An electronic device, for example electronic device 101, may include an accessory 402 that uses a laser light sensor 404. The processor 140 may use the laser light sensor 404 to obtain measurements and calculate a distance from the laser point to the edges of a projected image. A projector, for example projector 169, electronically connected to the electronic device can project special indicia in near-infrared light which is invisible to human eyes. The intervals between lines and the dash length as shown in FIG. 5 are known, identical, and equal.

As further provided in FIG. 5, "p" is used to denote the space between two lines, and "q" as the dash length and the space between two dashes. The projected image is not necessarily perpendicular to the surface, so the intervals are not widened equally. The indicia are used to calibrate the distortion by using an estimated magnification ratio. As shown in FIG. 5, if the line interval is "p" and there is "n" number of lines from the top edge to the laser point, the distance from the top edge to the line that is nearest to the laser point should be "np". However, the measured distance on the captured image is "a". This means the distance is magnified by a/(np). Therefore, the measured distance "y" should be shortened by "a/(np)" to match the position on the screen. The same principle applies to x. The calculated (x', y') is the coordinates of the starting point on the screen. In this way, the start position of a stroke is determined.

Although FIG. 5 illustrates one example of a projected image, this figure is provided in order to allow for the above discussion regarding calculating a relative position in regards to an absolute position of a touch event and is not intended to limit the scope of the present disclosure.

Figure 6:
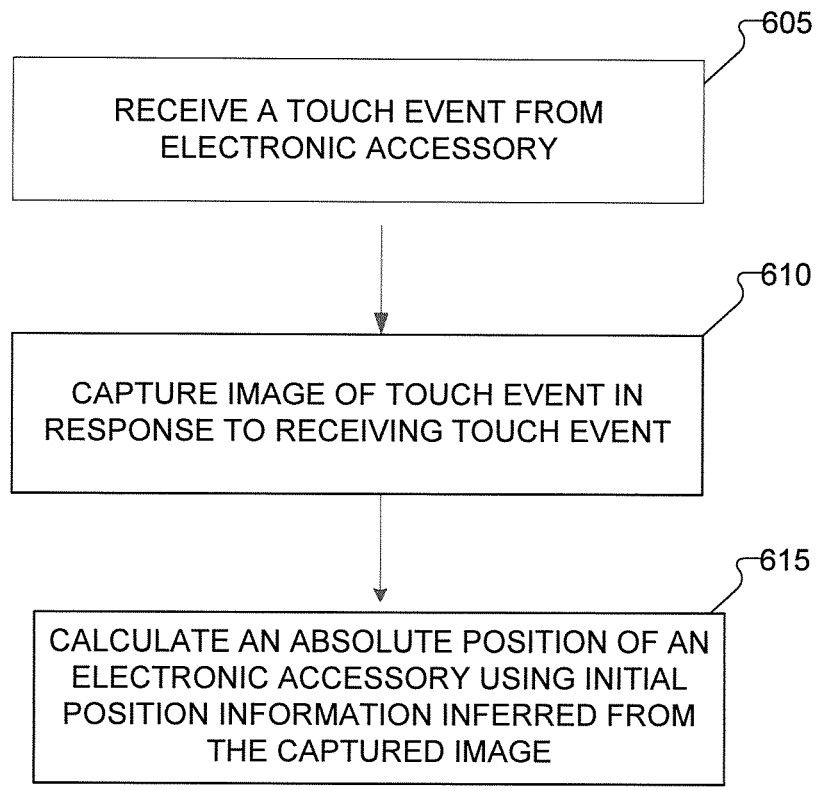
FIG. 6 illustrates a method for using a digital handwriting device to calculate an absolute position of an electronic accessory, according to various embodiments of the present disclosure.

FIG. 6 illustrates an example procedure for calculating an initial position of an electronic accessory, according to an embodiment of the present disclosure.

Referring to FIG. 6, the electronic device receives a touch event from an electronic accessory in operation 605; and in operation 610, captures an image of the touch event in response to receiving the touch event. After capturing the image of the touch event, the electronic device calculates an absolute position of the electronic accessory using initial position information inferred from the captured image in operation 615.

Figure 7:
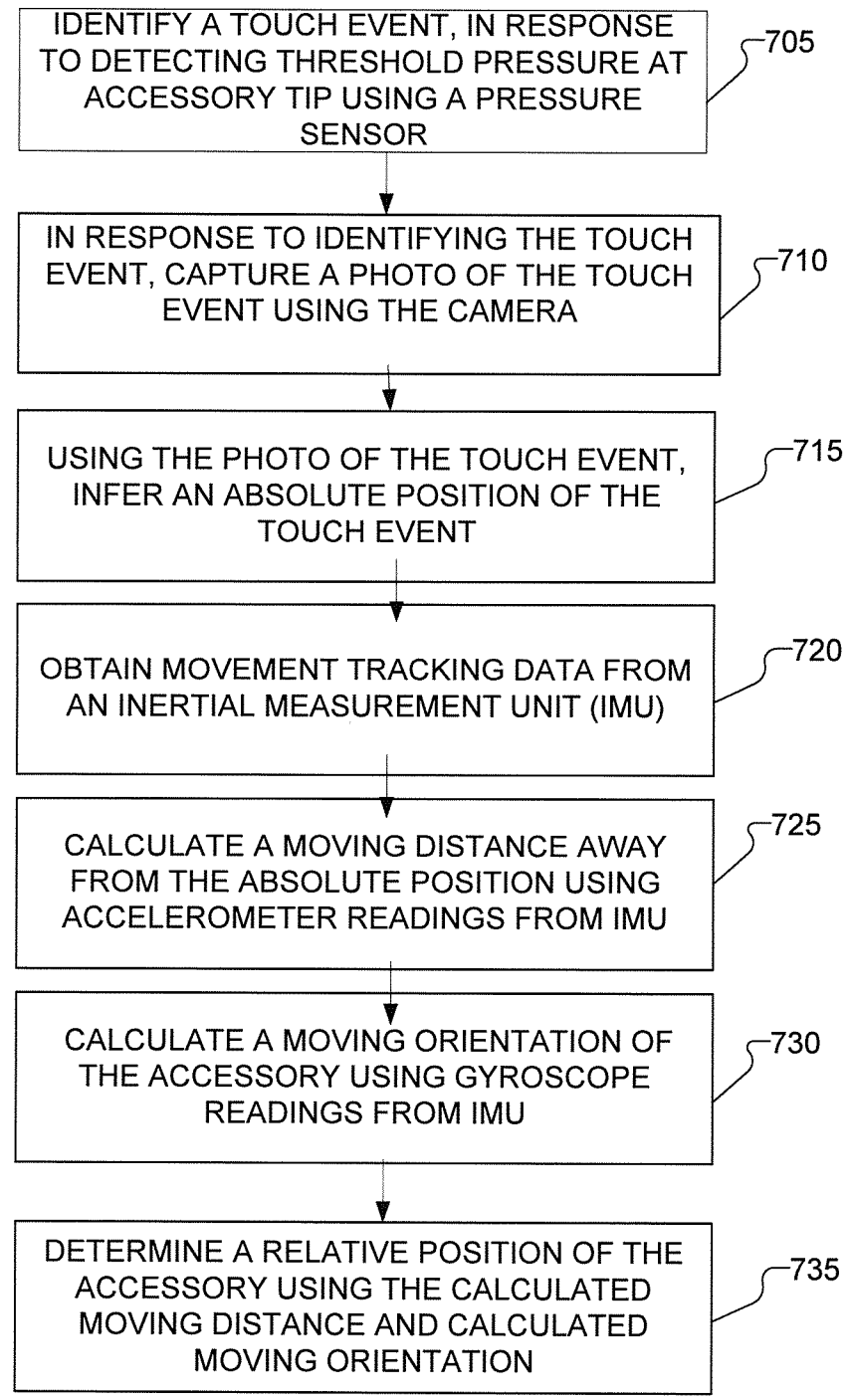
FIG. 7 illustrates a method for using a digital handwriting device to determine a relative position of an electronic accessory, according to various embodiments of the present disclosure.

FIG. 7 illustrates an example procedure for calculating relative movement of an electronic accessory, according to an embodiment of the present disclosure.

Referring to FIG. 7, the electronic device identifies a touch event by detecting a threshold pressure at the tip of an accessory using a pressure sensor, in operation 705. In response to identifying the touch event, the device captures a photo of the touch event using the camera in operation 710. Using the photo of the touch event, the electronic device infers an absolute position of the touch event in operation 715.

The electronic device obtains movement tracking data from an inertial measurement unit (IMU) in operation 720. The device uses the movement tracking data from the IMU to calculate a relative position of an accessory using relative distances away from the absolute position. More specifically, in operation 725, the electronic device calculates a moving distance away from the absolute position using accelerometer readings from the IMU. The device calculates a moving orientation from the absolute position of the touch event using readings obtained from a gyroscope in operation 730.

Finally, the electronic device determines a relative position of the accessory in operation 735, based on the calculated moving distance and calculated moving orientation in from the position of the accessory when the touch event occurred.

Figure 8:
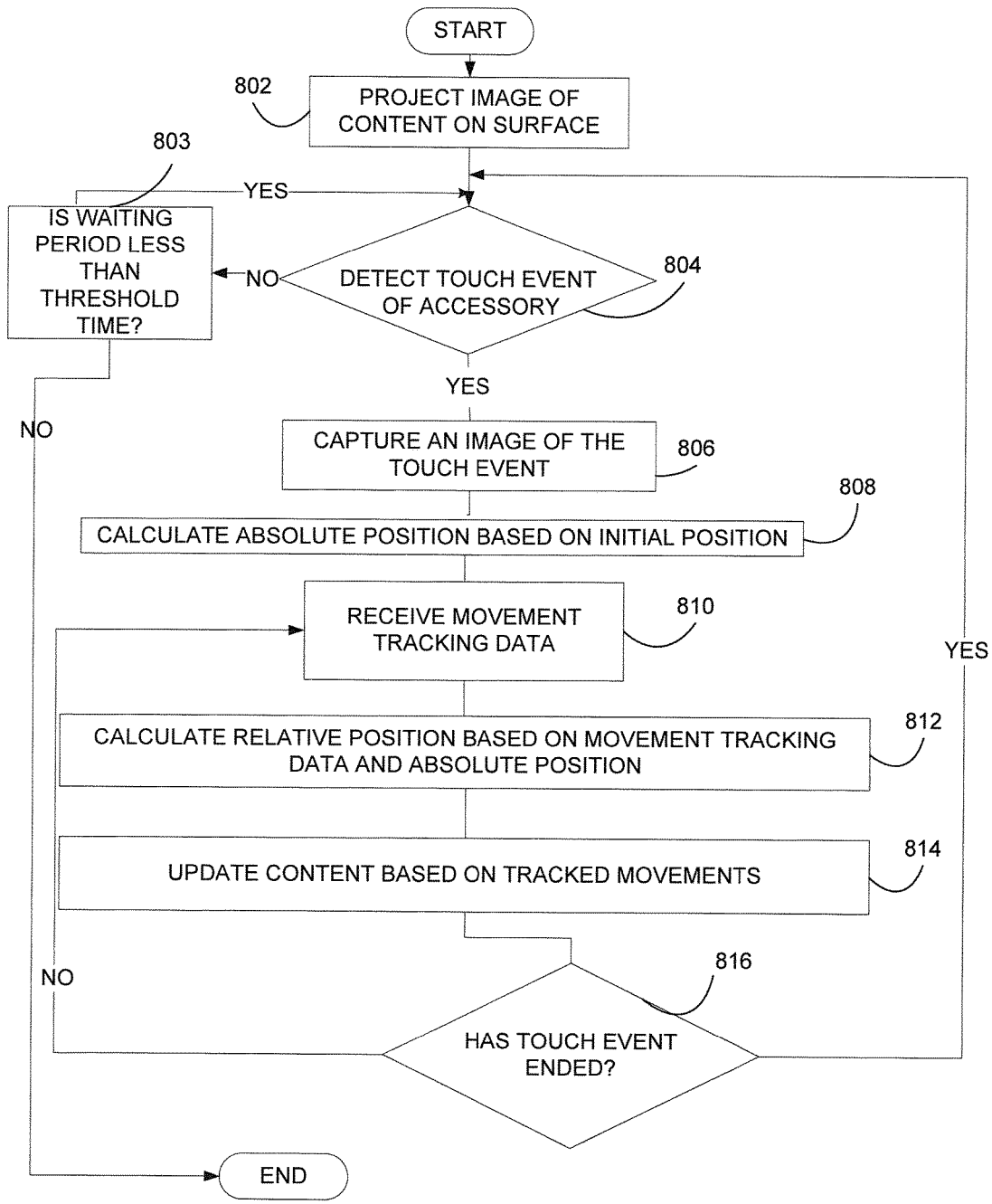
FIG. 8 illustrates a method for using a digital handwriting device according to an embodiment of the present disclosure.

FIG. 8 illustrates an example procedure for using an interactive digital handwriting system according to various embodiments of the present disclosure.

Referring to FIG. 8, an electronic device projects an image of content on a surface, in operation 802. The electronic device can project the image in response to a user selecting to use the interactive digital handwriting system, or otherwise indicating to the electronic device to project the image of the content. Additionally, in some embodiments of this disclosure, the surface can be any arbitrary surface.

After projecting the image, the electronic device waits for detection of a touch event of the electronic accessory, in operation 804. When the device does not detect a touch event, the device determines if it has been waiting for detection (e.g. waiting period) for a time period that is less than a threshold time period, as shown in operation 803. If the waiting period is less than the threshold time, then the device continues to wait for detection of a touch event. Stated differently, the electronic device returns to operation 804 if the waiting period is less than the threshold time period.

If the waiting period is longer than a threshold time period (or is not less than the threshold time period) and still no touch event is detected, then the procedure ends. Further operations may occur after the procedure shown in FIG. 8 ends. For example, if a threshold time period has passed and no touch event has occurred, then the device may cause the projection to end and/or the device turns off. However, such additional steps or operations are apparent to those of ordinary skill and are considered a part of the disclosure.

In contrast, if the electronic device detects a touch event after an image is projected, then the device proceeds to operation 806. More specifically, after detecting a touch event, the device captures an image of the touch event. After capturing an image of the touch event, the electronic device proceeds to calculate or determine an initial position of the accessory in operation 808. For example, the electronic device may use a camera to capture the image and the device may infer the initial position of the accessory based upon the photograph captured.

In operation 810, the electronic device receives movement tracking data relating to the accessory. The movement tracking data may include data obtained using an inertial movement unit disposed in a body of the electronic accessory. Furthermore, the movement tracking data may include data obtained using an accelerometer and a gyroscope.

After receiving the movement tracking data, the electronic device calculates a relative position of the accessory based on the movement tracking data and the absolute position in operation 812.

Next, the electronic device updates a content based on tracked movements in operation 814. In some embodiments, updating the content may include updating a projected image. For example, the device may update the projected image of a content in real-time, as a user is operating an electronic accessory according to the digital handwriting method described herein. In other words, the device may project an image of the content with a user's handwriting as a user is writing on or editing the content.

After updating the content based on the calculations of a relative position using tracked movements, the electronic device determines if the touch event has ended in operation 816. If the touch event has ended, the device starts the process over again by returning to prior to operation 804 and the device waits for detection of another touch event.

For example, if the pressure detected at the tip of the accessory becomes less than the threshold pressure, then the electronic device thinks the touch event is ended. Therefore, in response to a drop in pressure being detected at the tip of the accessory, such that the device no longer detects at least the threshold pressure, the device determines that the touch event is ended.

Once the device determines the touch event is over, it subsequently checks if another touch event of the accessory is detected. Accordingly, the operations repeat themselves, beginning again at operation 804.

However, if the electronic device reaches operation 816 and it determines that the touch event has not ended, the device returns to operation 810 and continues to receive the movement tracking data. Said differently, until the touch event has ended, the device continues receiving the movement tracking data (as is operation 810), calculating the relative position based on the movement tracking data and the absolute position (as in operation 812), and updating the content based on the tracked movements (as in operation 814) until such time when the touch event has ended.

Although the disclosure has been shown and described with reference to certain embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. An electronic device comprising:
   a camera;
   a transceiver; and
   at least one processor operably connected to the camera and the transceiver, wherein the at least one processor is configured to:
   identify content stored on the electronic device and projected onto a surface;
   calibrate projection of the content by instructing projection of indicia onto the surface and calculating, using the projected indicia, a distance between an edge of the projected content and a point on the projected content;
   capture, via the camera, an image of a touch event of an accessory of the electronic device to determine initial position data indicating an initial position of the accessory relative to the projected and calibrated content;
   receive, via the transceiver, movement tracking data indicating movement of the accessory, wherein the movement tracking data is received from one or more sensors in the accessory;
   track, during a touch event, the movement of the accessory to another position on the projected content from the initial position, wherein, to track the movement of the accessory to the other position, the processor is further configured to:
   calculate an absolute position of the accessory based on the initial position data, and
   calculate a moving distance of the accessory on the projected content relative to the absolute position using the movement tracking data; and
   update the content using the initial position data and the movement tracking data.

2. The electronic device of claim 1, wherein the at least one processor is further configured to:
   detect an end of the touch event;
   determine when a predetermined period of time has passed; and
   in response to not receiving an additional touch event during the predetermined period of time, stop a projection of the content and save the updated content.

3. The electronic device of claim 1, further comprising:
   the accessory, wherein the accessory includes a wireless module, a pressure sensor, and an inertial measurement unit (IMU) disposed therein, the IMU including at least one accelerometer and a gyroscope; and
   wherein the at least one processor is configured to receive the movement tracking data from the accessory, wherein the movement tracking data includes:
   measurements obtained from the at least one accelerometer for calculating the moving distance of the accessory, and
   measurements from the gyroscope for calculating a moving orientation.

4. The electronic device of claim 1, wherein the at least one processor is configured to update the content including:
   reproduce updates to the content based on the movement tracking data of the accessory at corresponding locations of the content displayed on a display of the electronic device; and
   save the updated content as an updated version.

5. The electronic device of claim 4, wherein the processor is configured to reproduce updates to the content based on the movement tracking data including determine a thickness of digital ink included in the updates based on force data received by a pressure sensor disposed at a tip of the accessory.

6. The electronic device of claim 1, wherein the processor is configured to update the content including update an image of the content projected on the surface to include updates to the content based on the movement tracking data.

7. The electronic device of claim 6, wherein the processor is configured to update the image of the content projected on the surface as the accessory is moved.

8. A method of operating an electronic device, the method comprising:
   identifying content stored on the electronic device and projected onto a surface;
   calibrating projection of the content by instructing projection of indicia onto the surface and calculating, using the projected indicia, a distance between an edge of the projected content and a point on the projected content;
   capturing an image of a touch event of an accessory of the electronic device to determine initial position data indicating an initial position of the accessory relative to the projected and calibrated content;
   receiving movement tracking data indicating movement of the accessory, wherein the movement tracking data is received from one or more sensors in the accessory;
   tracking, during a touch event, the movement of the accessory to another position on the projected content from the initial position, including:
   calculating an absolute position of the accessory based on the initial position data, and
   calculating a moving distance of the accessory on the projected content relative to the absolute position using the movement tracking data; and
   updating the content using the initial position data and the movement tracking data.

9. The method of claim 8, further comprising:
   detecting an end of the touch event;
   determining when a predetermined period of time has passed; and
   in response to not receiving an additional touch event during the predetermined period of time, stopping a projection of the content and saving the updated content.

10. The method of claim 8, wherein receiving the movement tracking data from the accessory comprises:

receiving the movement tracking data from an inertial measurement unit (IMU) disposed in the accessory, wherein the IMU includes at least one accelerometer and a gyroscope, and wherein receiving the movement tracking data from the IMU includes:

receiving measurements from the at least one accelerometer for calculating the moving distance; and receiving measurements from the gyroscope for calculating a moving orientation.

11. The method of claim 8, wherein updating the content comprises:

reproducing updates to the content based on the movement tracking data of the accessory at corresponding locations of the content displayed on a display of the electronic device; and saving the updated content as an updated version.

12. The method of claim 11, wherein reproducing the updates to the content based on the movement tracking data further comprises determining a thickness of digital ink included in the updates based on force data received by a pressure sensor disposed at a tip of the accessory.

13. The method of claim 8, wherein updating the content comprises updating an image of the content projected on the surface to include updates to the content based on the movement tracking data.

14. The method of claim 13, wherein updating the image of the content projected on the surface is performed as the accessory is moved.

15. A non-transitory computer readable medium embodying a computer program, the computer program comprising computer readable program code that when executed, by at least one processor of an electronic device, causes the electronic device to:

identify content stored on the electronic device and projected onto a surface;

calibrate projection of the content by instructing projection of indicia onto the surface and calculating, using the projected indicia, a distance between an edge of the projected content and a point on the projected content;

capture an image of a touch event of an accessory of the electronic device to determine initial position data indicating an initial position of the accessory relative to the projected and calibrated content;

receive movement tracking data indicating movement of the accessory, wherein the movement tracking data is received from one or more sensors in the accessory;

track, during a touch event, the movement of the accessory to another position on the projected content from the initial position, wherein, to track the movement of the accessory to the other position, the computer readable program code, when executed, further causes the electronic device to:

calculate an absolute position of the accessory based on the initial position data, and calculate a moving distance of the accessory on the projected content relative to the absolute position using the movement tracking data; and update the content using the initial position data and the movement tracking data.

16. The non-transitory computer readable medium of claim 15, further comprising computer readable program code that when executed, by the at least one processor of the electronic device, causes the electronic device to:

detect an end of the touch event;

determine when a predetermined period of time has passed; and in response to not receiving an additional touch event during the predetermined period of time, stop a projection of the content and save the updated content.

17. The non-transitory computer readable medium of claim 15, further comprising computer readable program code that when executed, by the at least one processor of the electronic device, causes the electronic device to:

reproduce updates to the content based on the movement tracking data of the accessory at corresponding locations of the content displayed on a display of the electronic device; and save the reproduced updates to the content as an updated version of the content.

* * * * *